United States Patent
Brewer et al.

(10) Patent No.: US 7,155,203 B2
(45) Date of Patent: Dec. 26, 2006

(54) METHOD AND APPARATUS FOR BILLING FOR USAGE-BASED GROUP COMMUNICATION BETWEEN WIRELESS DEVICES

(75) Inventors: Beth Ann Brewer, La Mesa, CA (US); Jason B. Kenagy, San Diego, CA (US)

(73) Assignee: Qualcomm Inc., San Diego, CA (US)

( * ) Notice: Subject to any disclaimer, the term of this patent is extended or adjusted under 35 U.S.C. 154(b) by 256 days.

(21) Appl. No.: 10/877,119

(22) Filed: Jun. 25, 2004

(65) Prior Publication Data
US 2005/0287982 A1  Dec. 29, 2005

(51) Int. Cl.
*H04M 11/00* (2006.01)

(52) U.S. Cl. .......... 455/405; 455/406; 455/518; 455/432.3; 455/519; 455/517; 379/127.01; 379/127.05; 379/114.01

(58) Field of Classification Search ........... 455/518, 455/521, 405, 421, 512, 445, 466, 406, 519, 455/432.3; 379/122.01, 122.25, 114.01
See application file for complete search history.

(56) References Cited

U.S. PATENT DOCUMENTS

| | | | |
|---|---|---|---|
| 2002/0037715 A1* | 3/2002 | Mauney et al. | 455/421 |
| 2002/0102999 A1* | 8/2002 | Maggenti et al. | 455/518 |
| 2002/0150091 A1 | 10/2002 | Lopponen et al. | 370/389 |
| 2004/0058670 A1* | 3/2004 | Pohutsky et al. | 455/406 |
| 2004/0097220 A1* | 5/2004 | McGregor et al. | 455/419 |
| 2005/0130624 A1* | 6/2005 | Batni et al. | 455/406 |

FOREIGN PATENT DOCUMENTS

DE  1505849  9/2005

OTHER PUBLICATIONS

3GPP TS 32.272 VO.0.2 (Mar. 2004) 3rd Generation Partnership Project; Technical Specification Group Service and System Aspects: p. 7, line 7; p. 16; Mar. 2004;XP-002313416.
ETSI 3rd Generation Partnership Project (3GPP) Digital cellular telecommunications system (phase2+); Universal Mobile Telecommunications System (UMTS); Service aspects charging and billing (3GPP TS 22.115 version 6.4.0 release 6); p. 10, paragraph 5; Mar. 2004 XP014027420.

* cited by examiner

*Primary Examiner*—Erika A. Gary
*Assistant Examiner*—David Q. Nguyen
(74) *Attorney, Agent, or Firm*—Philip R. Wadsworth; Robert J. O'Connell; Raphael Freiwirth

(57) ABSTRACT

A method and apparatus for billing for the usage of direct group communication services, such as push-to-talk services. A direct group communication service provider sets up an account for each direct communication service user whereby the user can establish a target group of wireless devices associated with his account. A billing server monitors the direct communication attempts of the wireless device of the user with the target group and bills the user based upon a predetermined criteria, such as number of wireless devices in the target group communicated with, use of a direct communication service, or duration of talk time.

50 Claims, 6 Drawing Sheets

METHOD AND APPARATUS FOR BILLING FOR USAGE-BASED GROUP COMMUNICATION BETWEEN WIRELESS DEVICES

BACKGROUND OF THE INVENTION

The present invention relates to point-to-point or point-to-multipoint communications systems. More specifically, the present invention relates to methods and apparatus for billing for the use of direct-communication between members of a group of wireless telecommunication devices.

DESCRIPTION OF THE RELATED ART

A class of wireless services intended for quick, one-to-one or one-to-many (group) communication between wireless devices has existed in various forms for many years. Typically, these services have been half-duplex where a user presses a "push-to-talk" (PTT) button on a phone/radio to initiate a group communication. If granted the "floor" of the group, the talker then generally speaks for a few seconds. After the talker releases the PTT button, other users of the group may request the floor. These services have traditionally been used in applications where one person needs to communicate with a group of people, such as field service personnel or automobile drivers, and these services are generally known as "group communication services."

The group communication service is generally subscribed by a user having one or more wireless telephones on monthly basis where the user pays a fixed monthly fee for a specific number of airtime minutes of the service. The monthly fee does not vary depending on usage. The user will pay the fixed monthly fee even the user does not use the service at all for a particular month. Further, the user typically pays the same price whether the service is used to communicate with a group of 50 people or two people. Otherwise, the user will be billed for the airtime, i.e., duration of network communications that is used by the PTT communications for the user's one or more wireless devices. There is a need, therefore, for a flexible billing method that allows a user to pay for only the PTT services used.

SUMMARY OF THE INVENTION

The disclosed embodiments provide novel and improved methods and apparatuses for billing for individual usage of push-to-talk services for mobile communication devices. In one aspect, the invention is a system for billing for direct mobile device to mobile device communication services. The system includes a billing server in communication with a wireless communication network, and a first mobile device capable of selectively directly communicating with a target set of one or more second mobile devices across the wireless communication network. The identity of the target set of one or more second mobile devices is stored at a group communication server. When the first mobile device starts to communicate with the target set through a direct communication, the billing server gathers billing information by tracking network usage parameters established by the first mobile device according to predefined criteria.

In one embodiment, the method for billing for direct mobile device to mobile device communication services includes receiving a direct communication request from a first mobile device, where the direct communication request is directed to a target set of one or more second mobile devices, and retrieving target set information. The method further tracks the attempt to establish a direct communication between the first mobile device and the target set according to the target set information, tracks network usage parameters related to the direct communication between the first mobile device and at least one second mobile device in the target set, and generates billing information for the first mobile device according to the network usage parameters.

In one embodiment, the apparatus for billing for direct mobile device to mobile device communication services includes a billing server in communication with a wireless communication network, and the billing server is capable of receiving a direct communication request from a first mobile device, where the direct communication request is directed to a target set of one or more second mobile devices, and retrieving target set information. The billing server further is capable of tracking the attempt to establish a direct communication between the first mobile device and the target set according to the target set information, tracking network usage parameters related to the direct communication between the first mobile device and at least one second mobile device in the target set, and generating billing information for the first mobile device according to the network usage parameters.

The present invention therefore provides an advantage to the carrier of wireless telephone services because the carrier can bill for each user of PTT or direct communication service without requiring a monthly pay plan for the service. Further, the carrier is not limited to purely billing for the actual airtime used by the direct communications made by the wireless device and can bill the user in a variety of manners for each direct communication performed.

Other objects, features, and advantages of the present invention will become apparent after review of the Brief Description of the Drawings, Detailed Description of the Invention, and claims.

DETAILED DESCRIPTION OF THE INVENTION

Figure 1A:
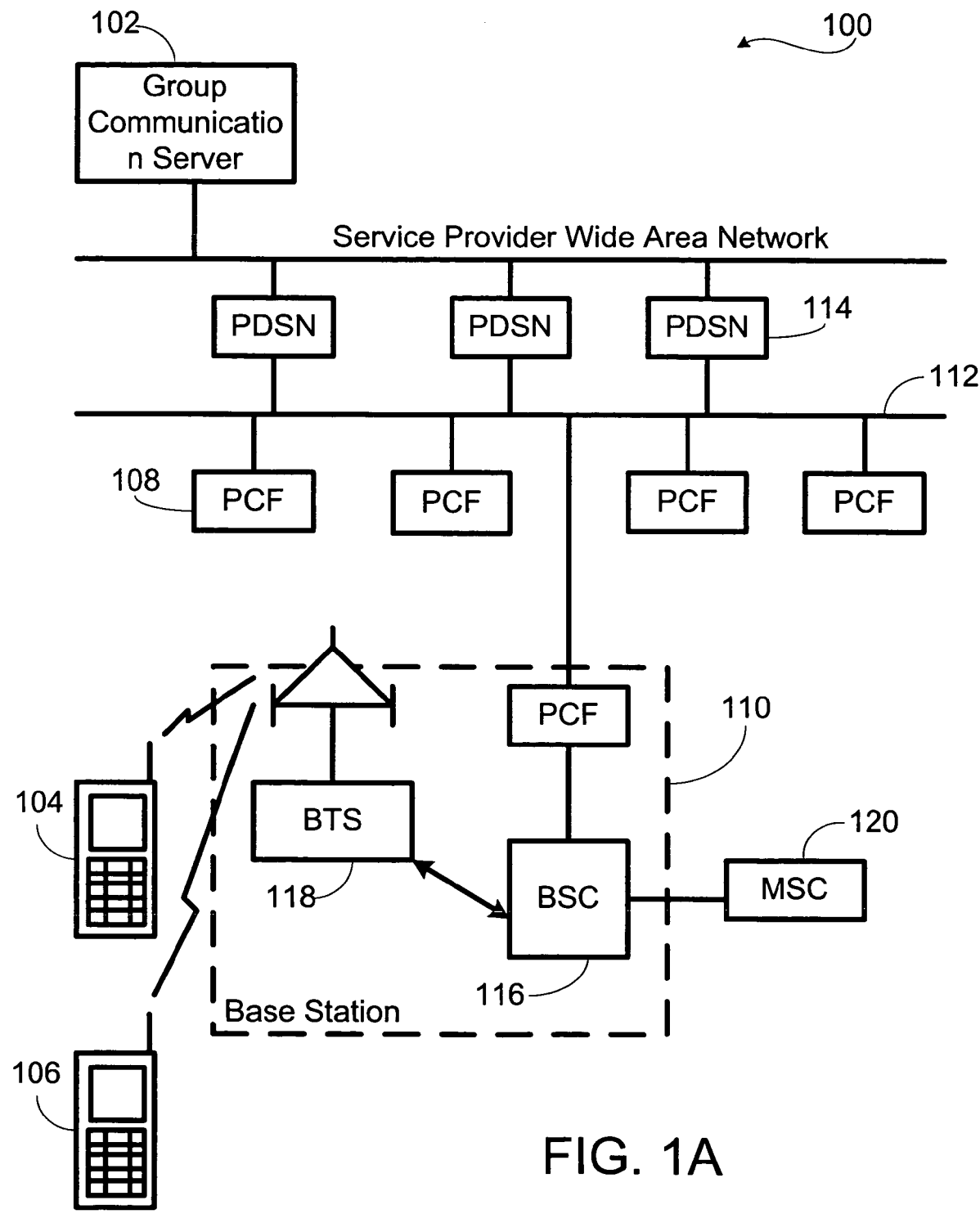
FIG. 1A illustrates a group communications system.

Before several embodiments are explained in detail, it is to be understood that the scope of the invention should not be limited to the details of the construction and the arrangement of the components set forth in the following description or illustrated in the drawings. Also, it is to be understood that the phraseology and terminology used herein is for the purpose of description and should not be regarded as limiting. In this description, the terms "communication device," "wireless device," "wireless communications device," "mobile device," and "handset" are used interchangeably, and "direct communication," "group communication," and "direct group communication" are also used interchangeably. The term "application" as used herein is intended to encompass executable and non-executable software files, raw data, aggregated data, patches, and other code segments. Further, like numerals refer to like elements throughout the several views.

FIG. 1A illustrates an architecture of a communication system 100 for implementing one embodiment of the system. The group communication system 100 is also known as a push-to-talk (PTT) system, a net broadcast service (NBS), a dispatch system, or a point-to-multi-point communication system. In one embodiment, the group communication system 100 includes a group communication server (GCS) 102, which may be deployed in either a centralized deployment or a regionalized deployment. The group communication server 102 may include, as known in the art, one or more processor, one or more memory units, and input/out hardware and software modules for various media communications, e.g., Internet protocol (IP) media communication. The group communication server 102 can handle both communication and billing functions or can share these functions with other servers and computer devices.

The mobile devices 104 and 106 can be based on different technologies, such as code division multiplex access (CDMA), time division multiplex access (TDMA), frequency division multiplex access (FDMA), the global system for mobile communications (GSM), orthogonal frequency division multiplexing (OFDM), or other protocols that may be used in a wireless communications network or a data communications network. The mobile devices (MDs) 104 and 106 may request packet data sessions using a data service option. Each MD may use the session to register its IP address with the group communication server 102 to perform group communication initiations. Each MD may also have a private identification number assigned by its service provider and used for the PTT communications. Though the MDs 104 and 106 are shown in FIG. 1A in communication with one BS 110, they may communicate through different BS 110.

In one embodiment, the group communication server 102 is connected to the service provider's packet data service nodes (PDSNs) 114 through service provider's network 116. MDs 104 and 106, upon requesting packet data sessions from the wireless infrastructure, may use the IP connectivity to connect to the group communication server 102 through the PDSNs 114. Each PDSN 114 may interface to a base station controller (BSC) 116 through a packet control function (PCF) 108 and a network 112. The PCF 108 may be co-located with the BSC 116 within a base station (BS) 110.

A PDSN 114 falls into one of several states, e.g., active or connected state, dormant state, and null or inactive state. In the active or connected state, an active traffic channel exists between the participating MD 104 and the BS 110 or BSC 116, and either side may send data. In the dormant state, no active traffic channel exists between the participating MD 104 and the BSC 116, but a point-to-point protocol (PPP) link is maintained between the participating MD 104 and the PDSN 114. In the null or inactive state, there is no active traffic channel between the participating MD 104 and the BSC 116, and no PPP link is maintained between the participating MD 104 and the PDSN 114.

Each one of MDs 104 and 106 can request packet data sessions. As part of establishing a packet data session, each MD can be assigned an IP address. Each MD can perform a registration process to notify the group communication server 102 of the MD's IP address. Registration can be performed using an IP protocol, such as session initiation protocol (SIP) over user datagram protocol (UDP). The IP address of a MD then can be used to contact the MD when the corresponding user is invited into or informed of a group communication. Alternatively, a service provider can assign a private identification number to each MD and this private identification number to be used during the group communication.

Once a communication is established, MDs 104 and 106 and the group communication server 102 can exchange media and signaling messages. In one embodiment, media is exchanged between the participating MDs and the group communication server 102 by using real-time protocol (RTP) over UDP. The signaling messages can also be exchanged by using a signaling protocol over UDP.

Figure 1B:
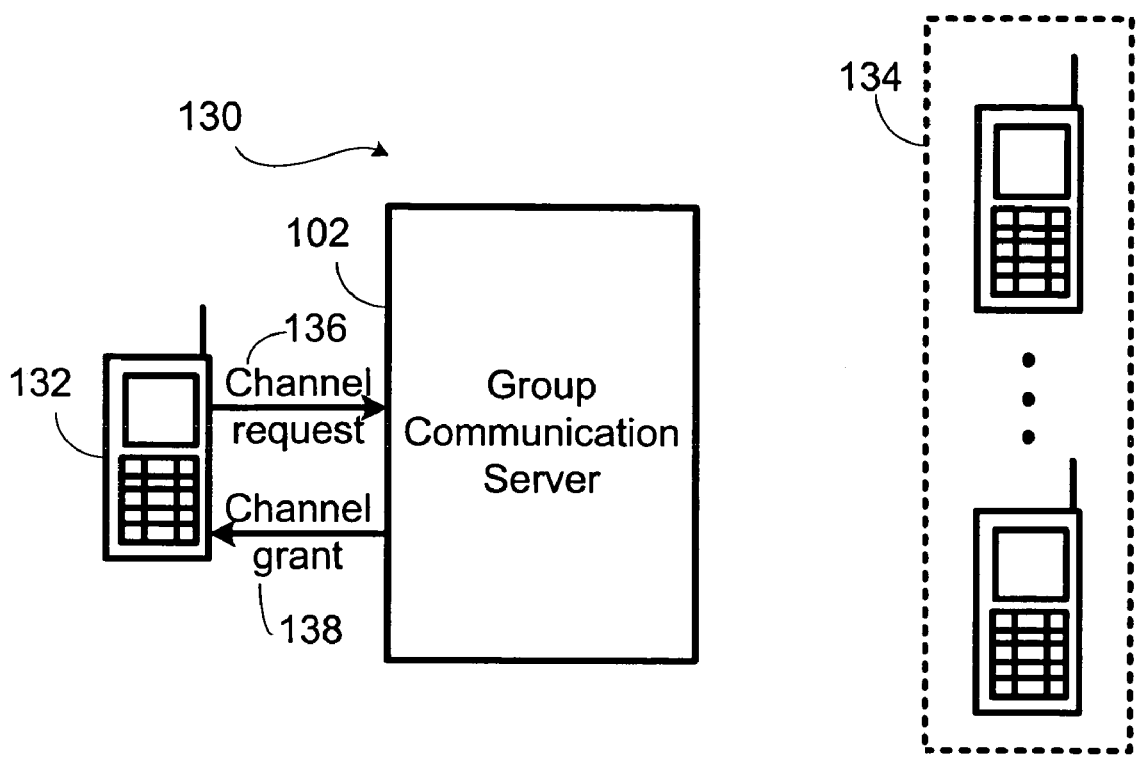
FIG. 1B illustrates a message flow diagram for a channel request.

Typically, the PTT feature is implemented in through a half-duplex channel, and before sending a message, a mobile device must request the channel from the group communication server 102. FIG. 1B illustrates a message flow between a mobile device 132 and a group communication server 102. When a user at the mobile device 132 wants to communicate with a predesignated target group 134 of mobile devices, the mobile device 132 must first request a channel from the group communication server 102. The mobile device 132 sends a channel request 136 to the group communication server 102. If the channel is available, the group communication server 102 reserves the channel for the mobile device 132 and sends a channel grant message to the mobile device 132.

Figure 1C:
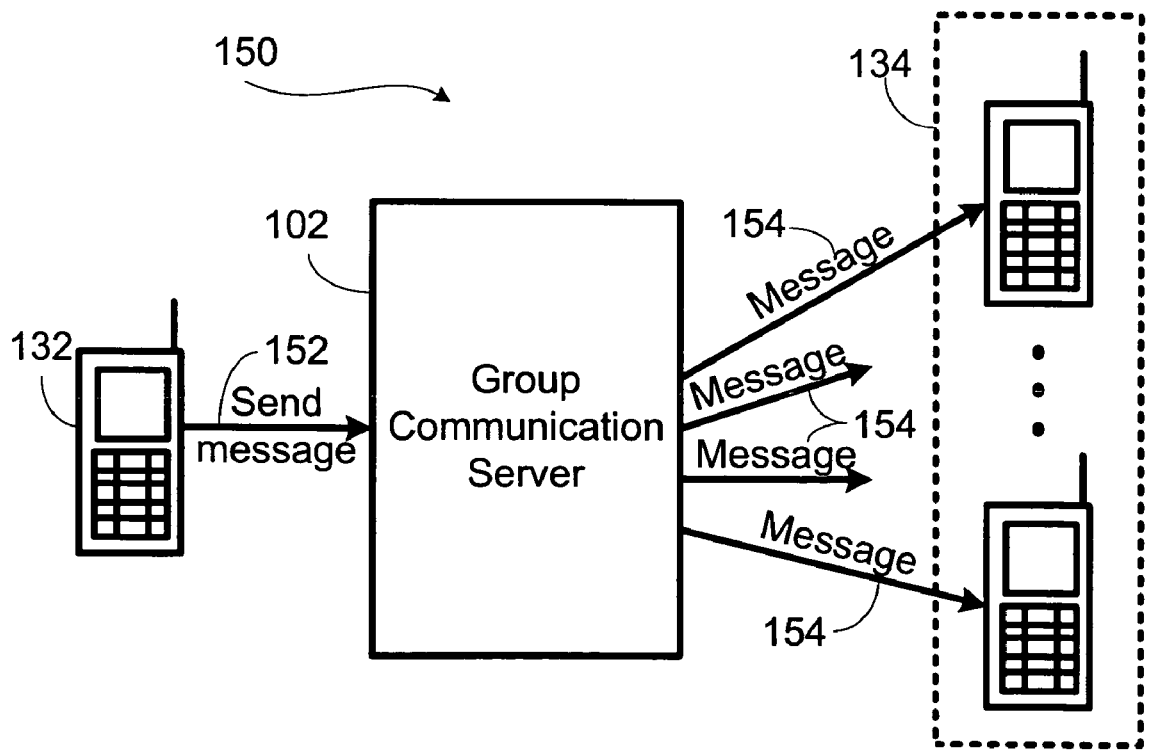
FIG. 1C illustrates a message flow diagram for a broadcast message.

After the mobile device 132 receives the channel grant message, the mobile device 132 can send messages to the target group 134 as illustrated in FIG. 1C. The mobile device 132 sends a message 152 to the group communication server 102. After receiving the message, the group communication server 102 identifies the target group 134 and broadcasts the message 154 to all mobile devices in the target group 134.

Figure 2:
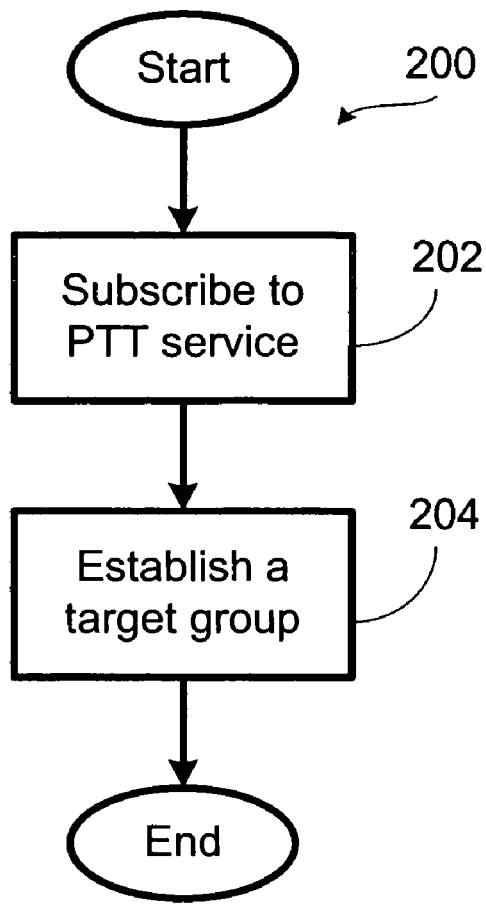
FIG. 2 illustrates a flow chart for a user subscription process.

FIG. 2 is a flow chart 200 for a user subscription process. Before using the PTT feature for group communication, a user subscribes to the PTT service, step 202, and designates a target group, step 204. The PTT feature may be offered as a pre-pay service, where a user pays an amount to the service provider and the service provider will deduct services charges from this amount every time the user uses the PTT service. Alternatively, the PTT feature may be billed on a monthly basis like traditional telecommunications services and each use of the PTT service will be deducted from the monthly total, as opposed to the charging only for airtime. After subscribing to the PTT feature, the subscriber may designate a target group with whom the user wishes to communicate directly through group communication services of the PTT feature. Generally, other subscribers of the PTT feature are included in this target group and they are listed in the target group through their user identification numbers, which can be either private identification numbers, IP addresses, mobile identification numbers (MINs), or electronic identification numbers (EINs). If a target has already been set, the subscriber may join this target group and designate it as his target group.

Figure 3:
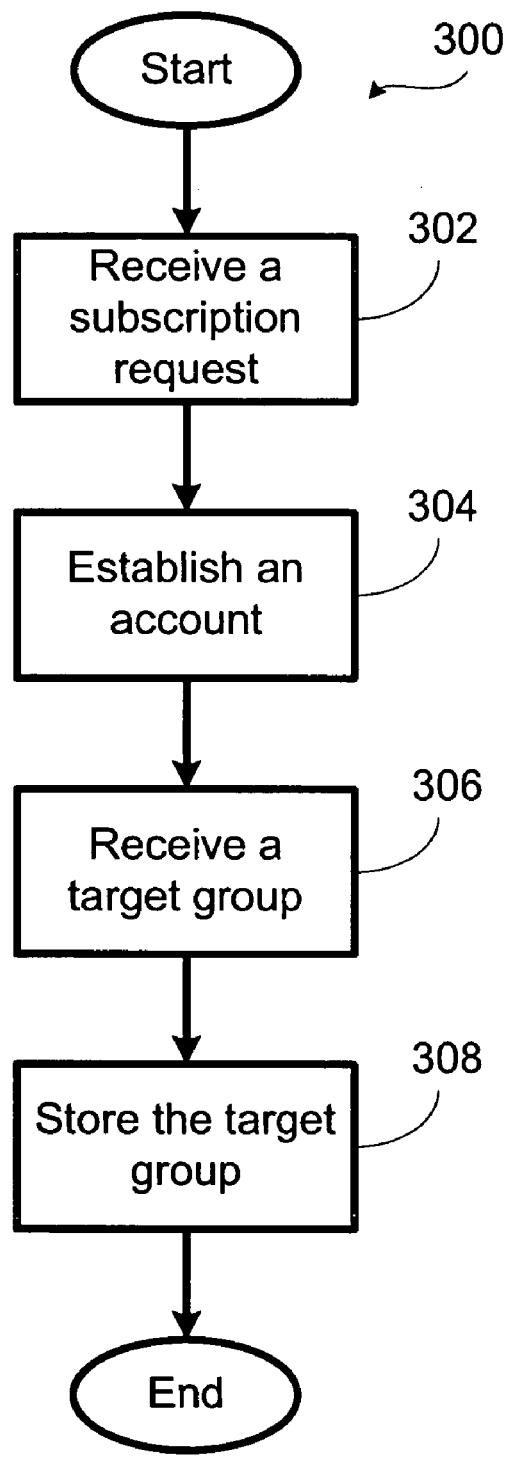
FIG. 3 illustrates a flow chart for a subscription process at a server.

FIG. 3 is a flow chart 300 for a subscription process at the group communication server 102. The group communication server 102 receives a subscription request from a user, step 302, and establishes an account for the user, step 304. The group communication server 102 may also receive a target group from the user, step 306. The group communication server 102 receives a list of user identification numbers designated as a target group and stores them as the target group for the user, step 308.

Figure 4:
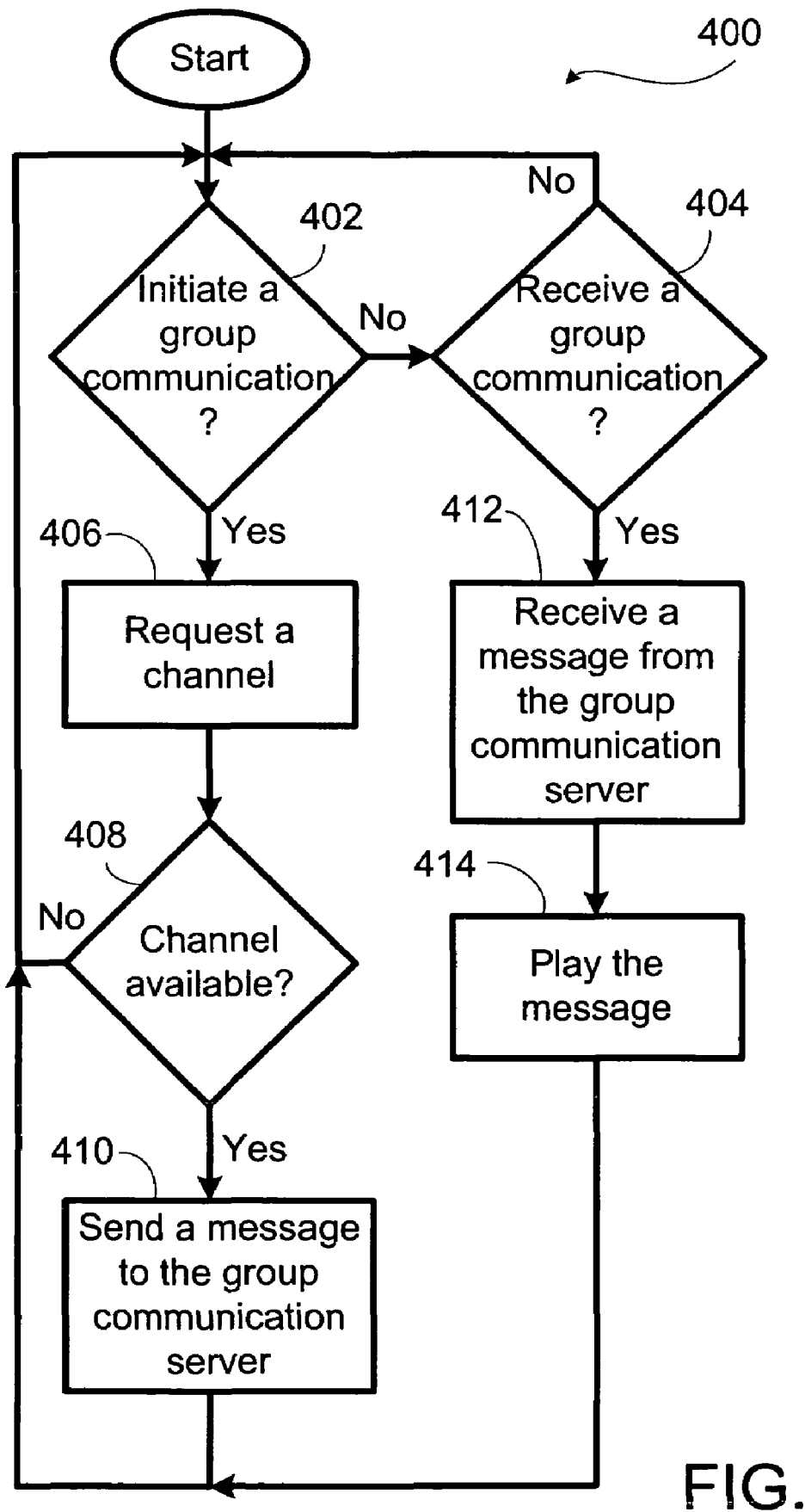
FIG. 4 illustrates a flow chart for a group communication process at a mobile device.

FIG. 4 is a flow chart 400 for a group communication process at a mobile device 104. The mobile device 104 checks whether the user wants to initiate a direct communication with his target group, step 402. The mobile device 104 detects that the user is ready to initiate a group communication when the user pushes a "push-to-talk" button on the mobile device 104. The mobile device 104 may have a dedicated push-to-talk button or alternatively may use an existing button or a combination of buttons on its keypad to active the direct group communication feature.

Generally, the direct group communication is through a half-duplex channel, and only one party is allowed to send a message or a data to the target group at any time. Before sending a message, the mobile device 104 requests a channel, step 406, from the group communication server 102. If the channel is not available, the mobile device 104 is stopped from sending the message to the target group. If the channel is available, the mobile device 104 is allowed to send the message to the group communication server 102, step 410. The group communication server 102 will distribute the message to all members listed in the target group. The message can be an audio or data message. An audio message could be a talk from the user; a data message could a data stored in the mobile device 104 that the user wants to share with the members in the target group. It should be noted that the mobile device 104 can determine the group for communication in an ad hoc manner, that it, designate members to receive the communication, as opposed to reliance on group identifications stored at the group communication server 102.

During a group communication, while the mobile device 104 is not sending messages, it can receive messages from other group members. The mobile device 104 checks whether a group message is received, step 404. If a group message is received, step 412, the mobile device 104 plays the message to the user, step 414. After playing the message, the mobile device 104 goes back to the routine of checking if the user is ready to send a message and if a message is received from the group communication server 102.

Figure 5:
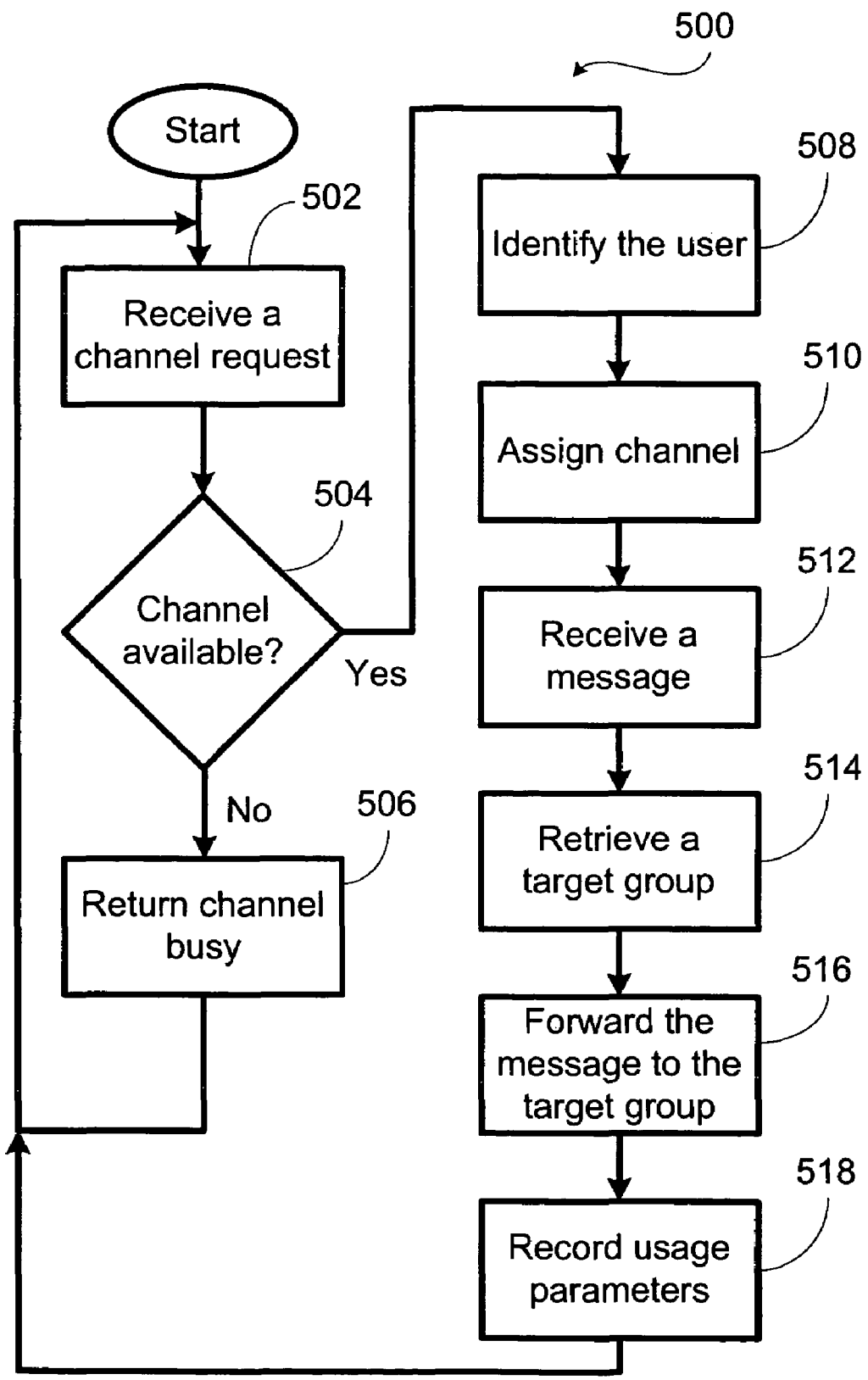
FIG. 5 illustrates a flow chart for a group communication process at a server.

FIG. 5 is a flow chart for a group communication process 500 at a group communication server 102. The group communication server 102 receives a channel request, step 502, from a mobile device 104, when the user of the mobile device 104 is ready to send a message to his target group. The group communication server 102 checks whether a channel is available, step 504. If the channel is not available, the group communication server 102 sends a channel busy signal to the requesting mobile device, step 506. If the channel is available, the group communication server 102 identifies the user of the mobile device 104, step 508, verifies that he is a subscriber, or alternatively, if the user has a pre-paid account for the group communication service, that there is enough credit in the user's account. The user may be identified by the EIN or MIN assigned to the mobile device. The user can also be prompted to enter a user identification and a password. After identifying the user, the group communication server 102 assigns the channel to the user, step 510. The group communication server 102 may also check the user's identity before checking the channel availability. If the user has not subscribed to the group communication services, or the user has no credit left in his account, the group communication server 102 preferably does not check for the availability of the channel. Alternatively, the user can be billed for the specific direct communication made at the time.

After assigning the channel to the user, the group communication server 102 receives a message, step 512, from the mobile device 104. The group communication server 102 retrieves a target group information, step 514, and forwards the message from the mobile device 104 to every member listed in the target group, step 516. After sending the message to the target group, the group communication server 102 resets the channel making it available for use by other members of the target group. The group communication server 102 can start to track network usage from the moment when the channel is granted to the user, and the group communication server 102 records network usage information, step 518. Such step is necessary in case all intended group connections cannot be bridged.

Figure 6:
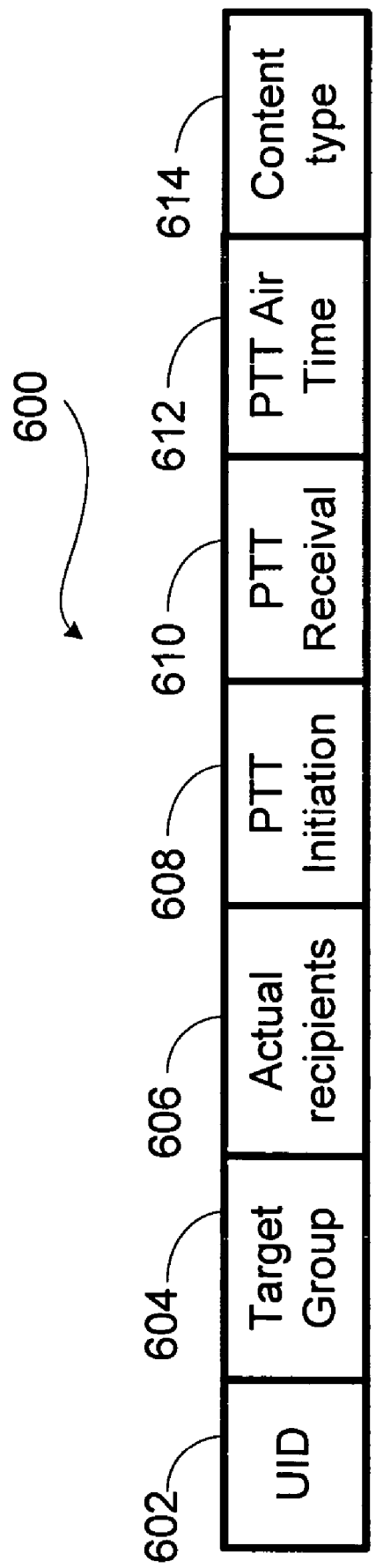
FIG. 6 illustrates a billing record entry for a mobile device.

FIG. 6 is an example of a usage record 600. The group communication server 102 may create a record for each usage of the network resources. The record may include, as way of example and not limitation, a user identification information (UID) 602, the target group information 604, the number of actual recipients of the communication 606, an indication on whether the user initiated the group communication 608 or the user was a mere recipient of the group communication 610, the actual duration of the group communication 612, and an indication of the type of the message 614. The service provider may place different charges for the group communication service. For example, the charge may depend on the number of members in the target group or the number of actual recipients. In some embodiments, the group communication server 102 will need to inquire which members of the target group is available, and the message is only sent to those members who are available. The group communication server 102 can also place different charges for initiating a group communication versus receiving a group communication. The size of the message may also be a factor in pricing, since a large message tends to use more network resources. Finally, the type of the message may also impact the cost of the group communication. An audio message may be cheaper that a multi-media message, where audio, video, and data are included in one message. For ad hoc groups created from the mobile device 104, the group communication server 102 will store the appropriate information for the group communication conducted by the mobile device 104.

Once a billing record 600 is generated for each group communication instance. The group communication server 102 may determine the cost of the group communication for each user and such cost is deducted from the user's account, if the user has a pre-paid service account. Alternately, the mobile device 104 can keep resident pay information, such as available credit, and decrement the balance, and perform such function separately and/or mirroring information stored at other servers on the network, to include group communication server 102.

The following is a use scenario of one embodiment of the system. A user signs up the group communication on a pre-pay basis. An account is opened for the user and a pre-pay amount is associated with the account. The user joins an existing group formed by his co-workers and this group is designated as the target group associated with the user's account.

When the user wants to talk to his co-workers using his mobile device, the user pushes a direct communication button (also known as push-to-talk button). Upon activation of this button, the mobile device sends a request for a channel to the group communication server 102. The request is sent through a wireless network. The group communication server receives the channel request, verifies the user, and grants the channel to the user. While the channel is granted to the user, it will not be accessible to other members of the target group. The group communication server also starts tracking network usage.

After receiving the channel from the group communication server 102, the user speaks to the mobile device while holding the push-to-talk button. The user's speech is sent from the mobile device to the group communication server 102. The group communication server retrieves the target group information associated with the user and forwards the user's speech (message) to all members listed in the target group.

It is possible that not all the members in the target group are available to receive the communication from the user. If a member is not available, the group communication server can deliver the message to a mailbox associated with this member, if the receiving member has subscribed to a mailbox service. The group communication server 102 can count the delivery of a message to the mailbox as a normal delivery.

After delivering the message to the target group, the group communication server 102 creates a record for the communication. The record indicates that the user is the creator of the group communication, the target group has, e.g., 12 people, and the actual number of recipients, e.g., is 10, the duration of the message is 5 seconds, and the type of the message is audio. The cost associated with this communication will be deducted from the user's account.

After sending his message to the target group, the user may receive a reply message from one of the members of the target group, and the reply message may be a picture followed by comments from this replying member. The group communication server 102 may check the user's account before sending the reply message to the user. If the user's account indicates that there is no available credit, the group communication server may not deliver the reply message to the user. If there is available credit, then the reply message is delivered to the user. After the delivery of the reply message, a record will be created for this reply, and it will indicate the user is a recipient of the reply message, the message lasted, e.g., 10 seconds, and the message type is multi-media (graphics and audio).

The group communication service provider can set up different charges for different uses. For example, the service provider can charge the user for only group communications initiated by the user and not charge any communication for the group communications where the user is a merely recipient. The service provider may also charge for only the message delivered and not charge for the message destined to the target group members who are not available. Alternatively, the service provider can charge for all network usages, whether or not a message is delivered to any recipient. Those of skill in the art would understand that other charge criteria, or any combination of criteria, may be implemented.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein.

The steps of a method or algorithm described in connection with the embodiments disclosed herein can be embodied directly in hardware, in a software module executed by a processor, or in a combination of the two. A software module may reside in RAM memory, flash memory, ROM memory, EPROM memory, EEPROM memory, registers, a hard disk, a removable disk, a MD-ROM, or any other form of storage medium known in the art. An exemplary storage medium is coupled to the processor, such that the processor can read information from, and write information to, the storage medium. In the alternative, the storage medium is integral to the processor. The processor and the storage medium can reside in an ASIC. The ASIC may reside in a user terminal. In the alternative, the processor and the storage medium can reside as discrete components in a user terminal.

The description of the disclosed embodiments is provided to enable any person skilled in the art to make or use the present invention. Various modifications to these embodiments may be readily apparent to those skilled in the art, and the generic principles defined herein may be applied to other embodiments, e.g., in an instant messaging service or any general wireless data communication applications, without departing from the spirit or scope of the invention. Thus, the present invention is not intended to be limited to the embodiments shown herein but is to be accorded the widest scope consistent with the principles and novel features disclosed herein. The word "exemplary" is used exclusively herein to mean "serving as an example, instance, or illustration." Any embodiment described herein as "exemplary" is not necessarily to be construed as preferred or advantageous over other embodiments.

What is claimed is:

1. A system for billing for direct mobile device to mobile device communication services, comprising:
    a server performing billing services in communication with a wireless communication network; and
    a first mobile device capable of selectively directly communicating with a predesignated target set of one or more second mobile devices across the wireless communication network,
    wherein upon starting to communicate with the target set through a direct communication, the server gathers billing information from network usage parameters established for the first mobile device; and
    wherein the server determines if direct communication between the first mobile device and the predesignated target set of one or more second mobile devices is permitted base on the network usage parameters.

2. The system of claim 1, wherein the direct communication being established through a half-duplex channel.

3. The system of claim 1, wherein the network usage parameters include the number of second mobile devices in the target set.

4. The system of claim 1, wherein the network usage parameters include the cumulative talk time.

5. The system of claim 1, wherein the network usage parameters include the number of responses received from the target set.

6. The system of claim 1, wherein the network usage parameters include number of direct communications initiated by the first mobile device.

7. The system of claim 1, wherein the server communicates the result of the determining to the wireless communication network; and the wireless communication network permits communication between the first mobile device and the predesignated target set of one or more second mobile devices if the result of the determining allows the direct communication.

8. The system of claim 1, wherein the network usage parameters include a prepayment method by the first mobile device.

9. The system of claim 1, wherein the server communicates the result of the determining to the wireless communication network; and the wireless communication network permits communication between the first mobile device and the predesignated target set of one or more second mobile devices if the result of the determining allows the direct communication.

10. A system for billing for direct mobile device to mobile device communication services, comprising:

means for providing billing service in communication with a wireless communication network;

first mobile means for communication capable of selectively directly communicating with a predesignated target set of one or more second mobile devices across the wireless communication network, wherein upon starting to communicate with the target set through a direct communication, the means for providing billing service gathers billing information from network usage parameters established for the first mobile means for communication; and wherein the means for providing billing service determines if direct communication between the first mobile device and the predesignated target set of one or more second mobile devices is permitted base on the network usage parameters.

11. The system of claim 10, wherein the direct communication being established through a half-duplex channel.

12. The system of claim 10, wherein the network usage parameters include the number of second mobile devices in the target set.

13. The system of claim 10, wherein the network usage parameters include a cumulative talk time.

14. The system of claim 10, wherein the network usage parameters include a number of responses received from the target set.

15. The system of claim 10, wherein the network usage parameters include a number of direct communications initiated by the first mobile device.

16. The system of claim 10, wherein the network usage parameters include a prepayment method by the first mobile device.

17. The system of claim 10, wherein the means for providing billing service communicates the result of the determining to the wireless communication network; and the wireless communication network permits communication between the first mobile device and the predesignated target set of one or more second mobile devices if the result of the determining allows the direct communication.

18. A method for billing for direct mobile device to mobile device communication services, comprising the steps of:

receiving at a server a direct communication request from a first mobile device, the direct communication request being directed to a predesignated target set of one or more second mobile devices;

retrieving target set information;

staffing to track a direct communication attempt between the first mobile device and the target set according to the target set information;

tracking network usage parameters related to the direct communication between the first mobile device and at least one second mobile device in the target set;

generating billing information for the first mobile device according to the network usage parameters; and determining if direct communication between the first mobile device and the predesignated target set of one or more second mobile devices is permitted based on the network usage parameters.

19. The method of claim 18, further comprises the steps of:

receiving the target set information from the first mobile device; and storing the target set information.

20. The method of claim 18, wherein the step of starting to track a direct communication attempt further comprises the step of tracking an attempt to establish a half-duplex channel between the first mobile device and the target set.

21. The method of claim 18, further comprises the steps of:

receiving a response from at least one second mobile device; and forwarding the response from the at least one second mobile device to the first mobile device.

22. The method of claim 18, wherein the step of tracking network usage parameters further comprises the step of tracking a number of second mobile devices in the target set.

23. The method of claim 18, wherein the step of tracking network usage parameters further comprises the step of tracking a number of devices that the first mobile device establishes contact with.

24. The method of claim 18, wherein the step of tracking network usage parameters further comprises the step of tracking a cumulative talk time.

25. The method of claim 18, wherein the step of tracking network usage parameters further comprises the step of tracking a number of responses received from the target set.

26. The method of claim 18, wherein the step of tracking network usage parameters further comprises the step of tracking a number of direct communications initiated by the first mobile device.

27. The method of claim 18, wherein the step of tracking network usage parameters further comprises a prepayment method by the first mobile device.

28. The method of claim 18, further comprises the steps of:

communicating the result of the determining to a wireless communication network; and permitting communication between the first mobile device and the predesignated target set of one or more second mobile devices through the wireless communication network if the result of the determining allows the direct communication.

29. An apparatus for billing for direct mobile device to mobile device communication services, comprising:

a server in communication with a wireless communication network, the sewer being capable of performing the steps of:

receiving a direct communication request from a first mobile device, the direct communication request being directed to a predesignated target set of one or more second mobile devices;

retrieving target set information;

staffing to track a direct communication attempt between the first mobile device and the target set according to the target set information;

tracking network usage parameters related to the direct communication between the first mobile device and at least one second mobile device in the target set;

generating billing information for the first mobile device according to the network usage parameters; and determining if direct communication between the first mobile device and the predesignated target set of one or more second mobile devices is permitted based on the network usage parameters.

30. The apparatus of claim 29, wherein the server further being capable of performing the steps of:

receiving the target set information from the first mobile device; and storing the target set information.

31. The apparatus of claim 29, wherein the server further being capable of performing the steps of establishing a half duplex channel between the first mobile device and the target set.

32. The apparatus of claim 29, wherein the server further being capable of performing the steps of:

receiving a response from at least one second mobile device; and forwarding the response from the at least one second mobile device to the first mobile device.

33. The apparatus of claim 29, wherein the step of tracking network usage parameters further comprises the step of tracking a number of second mobile devices in the target set.

34. The apparatus of claim 29, wherein the step of tracking network usage parameters further comprises tracking a number of devices that the first mobile device establishes contact with.

35. The apparatus of claim 29, wherein the step of tracking network usage parameters further comprises the step of tracking a cumulative talk time.

36. The apparatus of claim 29, wherein the step of tracking network usage parameters further comprises the step of tracking a number of responses received from the target set.

37. The apparatus of claim 29, wherein the step of tracking network usage parameters further comprises the step of tracking a number of direct communications initiated by the first mobile device.

38. The apparatus of claim 29, wherein the step of tracking network usage parameters further comprises a prepayment method by the first mobile device.

39. The apparatus of claim 29, wherein the server further being capable of performing the steps of:

communicating the result of the determining to the wireless communication network; and permitting communication between the first mobile device and the predesignated target set of one or more second mobile devices through the wireless communication network if the result of the determining allows the direct communication.

40. A computer-readable medium comprising at least one instruction, which, when executed by a machine, cause the machine to perform operations for billing of direct mobile device to mobile device communication services, the instruction comprising:

a set of the instructions for receiving a direct communication request from a first mobile device, the direct communication request being directed to a predesignated target set of one or more second mobile devices;

a set of the instructions for retrieving target set information;

a set of the instructions for tracking a direct communication attempt between the first mobile device and the target set according to the target set information;

a set of the instructions for tracking network usage parameters related to the direct communication between the first mobile device and at least one second mobile device in the target set;

a set of the instructions for generating billing information for the first mobile device according to the network usage parameters; and a set of the instructions for determining if direct communication between the first mobile device and the predesignated target set of one or more second mobile devices is permitted based on the network usage parameters.

41. The computer-readable medium of claim 40, further comprising a set of instructions for:

receiving the target set information from the first mobile device; and storing the target set information.

42. The computer-readable medium of claim 40, further comprising a set of instructions for establishing a half-duplex channel between the first mobile device and the target set.

43. The computer-readable medium of claim 40, further comprising:

a set of instructions for receiving a response from at least one second mobile device; and a set of instructions for forwarding the response from the at least one second mobile device to the first mobile device.

44. The computer-readable medium of claim 40, further comprising a set of instructions for tracking a number of second mobile devices in the target set.

45. The computer-readable medium of claim 40, further comprising a set of instructions for tracking a number of devices that the first mobile device establishes contact with.

46. The computer-readable medium of claim 40, further comprising a set of instructions for tracking a cumulative talk time.

47. The computer-readable medium of claim 40, further comprising a set of instructions for tracking a number of responses received from the target set.

48. The computer-readable medium of claim 40, further comprising a set of instructions for tracking a number of direct communications initiated by the first mobile device.

49. The computer-readable medium of claim 40, further comprises a set of instructions for a prepayment method by the first mobile device.

50. The computer-readable medium of claim 40, further comprises:

a set of instructions for communicating the result of the determining to a wireless communication network; and a set of instructions for permitting communication between the first mobile device and the predesignated target set of one or more second mobile devices through the wireless communication network if the result of the determining allows the direct communication.

* * * * *